Dec. 13, 1938.　　　　A. S. KNAPP　　　　2,140,158
ELECTRICAL APPLIANCE
Filed Jan. 17, 1936
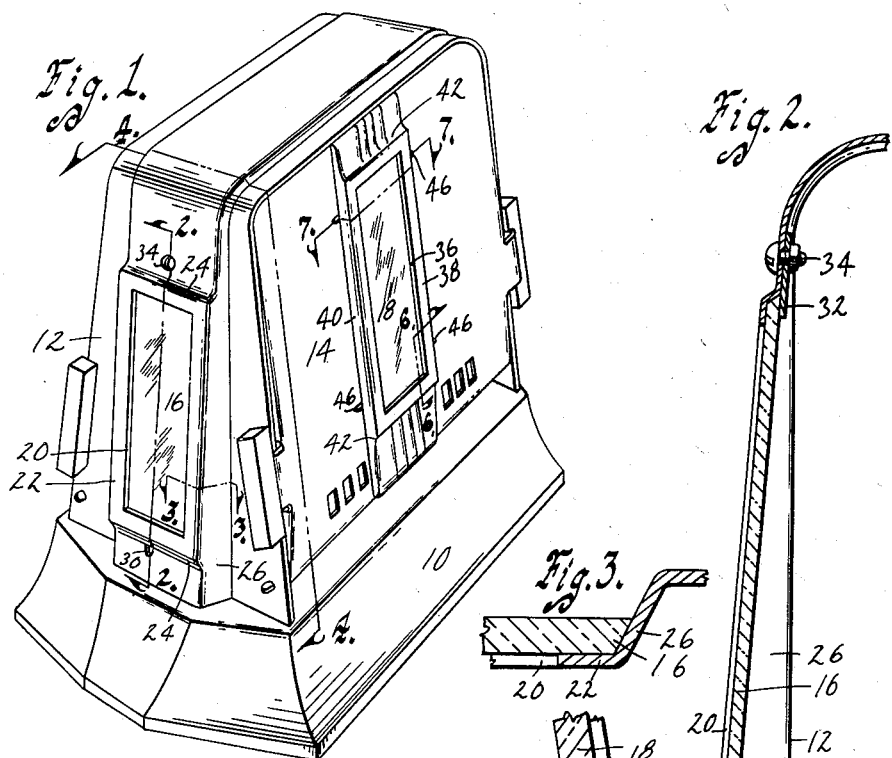
Inventor
Andrew S. Knapp
by Bair, Freeman & Sinclair
Attorneys Patented Dec. 13, 1938

2,140,158

UNITED STATES PATENT OFFICE 2,140,158

ELECTRICAL APPLIANCE

Andrew S. Knapp, St. Louis, Mo., assignor to Knapp-Monarch Company, St. Louis, Mo., a corporation of Missouri Application January 17, 1936, Serial No. 59,586

2 Claims. (Cl. 220—82)

The object of my invention is to provide an electrical appliance having a sheet metal wall member with a simple means for inexpensively mounting in the wall member a transparent element, the wall member being either a stationary wall of the appliance or a movable wall such as a door or the like.

A further object is to provide a sheet metal wall member of an electrical appliance or the like with a transparent element through which the heating element of the appliance and/or the material being acted upon, such as bread in a toaster, can be seen.

Another object is to provide a simple construction which can be readily manufactured and which will effectively retain a transparent element, such as a pane of glass or the like in assembled position without detracting from the ornamental character of the appliance wall, but rather adding to it, and at the same time producing the appliance at but very slight additional expense for forming of the wall member and assembling of the transparent element relative thereto.

With these and other objects in view, my invention consists in the construction, arrangement and combination of the various parts of the device, whereby the objects contemplated are attained, as hereinafter more fully set forth, pointed out in my claims, and illustrated in the accompanying drawing, in which:

Figure 1 is a perspective view of an electrical appliance (a bread toaster being illustrated) embodying my invention.

Figure 2 is an enlarged vertical sectional view on the line 2—2 of Figure 1, showing a transparent element mounted in an end wall of the toaster.

Figure 3 is an enlarged view on the line 3—3 of Figure 1.

Figure 4 is an inside view of the end wall as taken on the section line 4—4 of Figure 1.

Figure 5 is a side elevation of a door for the toaster.

Figure 6 is an enlarged sectional view on the line 6—6 of Figure 1, showing the coaction of the transparent element with the door; and Figure 7 is an enlarged sectional view on the line 7—7 of Figure 1, further showing the coaction of the transparent element with the toaster door.

On the accompanying drawing I have used the reference numeral 10 to indicate the base of a bread toaster, an end wall thereof being indicated at 12. The toaster is provided with a hinged door 14, and in connection with the end wall and door I have shown transparent elements 16 and 18.

The following provision is made for mounting the transparent element 16. A rectangular opening 20 is provided in the end wall 12, the wall being made of sheet metal. The sheet metal is so deformed that a flange 22 surrounds the opening 20, and this flange terminates in upper and lower shoulders 24 and side shoulders 26. The shoulders 24 and 26 are inclined relative to the plane of the wall 12, and are offset outwardly, thus providing a peripheral shoulder for surrounding the transparent element 16, and a peripheral flange to prevent outward movement of the transparent element relative to the wall 12.

For holding the transparent element 16 in position I provide a tongue 28 cut out of the sheet metal wall 12, adjacent the bottom shoulder 24, the perforation 30 being left by cutting through the sheet metal at the sides and bottom of the tongue 28.

For retaining the upper end of the transparent element 16 in position, I provide a strip of sheet metal or the like 32, bolted in position by a bolt 34, and overlapping the upper inner edge of the transparent element. After the transparent element is in position, the tongue 28 can be bent from its original dotted position in Figure 2 to its full line position for retaining the transparent element 16 in position.

The construction can be somewhat modified, as I will now describe, in connection with the door 14. Referring to Figures 4, 5, 6 and 7 a rectangular opening 36 is provided surrounded by a flange 38. This flange terminates in side shoulders 40 and upper and lower shoulders 42, which are deformed outwardly from the plane of the door 14. The transparent element 18 is retained in assembled position by tongues 44, which are cut out of the wall 14, leaving perforations 46. These tongues originally assume the dotted position in Figure 7, and the position indicated at 44a before assembly.

After the transparent element 18 is placed in position the tongues are bent downwardly, as shown by solid lines in Figure 7, and thus I provide a simple and inexpensive means for retaining the transparent element 18 against the flange 38, the shoulders 40 and 42 retaining the transparent element against movement in the plane of the door 14.

It will be noted that the shoulders 40 are formed at right angles to the plane of the doors, rather than being inclined as are the shoulders 24, 26 and 42. Obviously the shoulders can be made either way, so long as they effectively serve to retain the transparent elements against movement in the plane of the wall or door. The transparent elements may be of sheet mica or glass of such composition that it will withstand the heat generated by the appliance.

Obviously the transparent elements can be applied to appliances other than electric toasters, and other changes as well can be made without departing from the real spirit and purpose of my invention, and it is my intention to cover by my claims, any modified forms of structure or use of mechanical equivalents, which may be reasonably included within their scope.

I claim as my invention:

1. In an electrical appliance, a relatively flat, rectangular sheet metal wall member having an outwardly deformed portion narrower than the width of the wall member and spanning the wall member, the sides of said portion thereby defining shoulders, said outwardly deformed portion having an opening therein, a transparent element spanning said opening, the edge of said portion adjacent the ends of said opening being depressed toward the wall member to provide other shoulders which in conjunction with said first shoulders substantially confine the edges of said transparent element against movement in the plane of said wall member and a plurality of spaced means projecting from the inside of said wall member adjacent said shoulders and overlapping the edges of said transparent element to retain it in assembled position.

2. In an electrical appliance, a relatively flat, rectangular sheet metal wall member having an outwardly deformed portion narrower than the width of the wall member and spanning the wall member, the sides of said portion thereby defining shoulders, said outwardly deformed portion having an opening therein, a transparent element spanning said opening, the edge of said portion adjacent the ends of said opening being depressed toward the wall member to provide other shoulders which in conjunction with said first shoulders substantially confine the edges of said transparent element against movement in the plane of said wall member and means to retain said transparent element in assembled position within said outwardly deformed portion of said wall.

ANDREW S. KNAPP.